United States Patent
Hirsch et al.

(10) Patent No.: US 11,271,470 B2
(45) Date of Patent: Mar. 8, 2022

(54) METHOD FOR CONTROLLING A RECTIFIER, CONTROL DEVICE FOR A RECTIFIER AND RECTIFIER

(71) Applicant: Robert Bosch GmbH, Stuttgart (DE)

(72) Inventors: Michele Hirsch, Esslingen (DE); Florian Malchow, Stuttgart (DE); Tino Merkel, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 16/610,162

(22) PCT Filed: Apr. 25, 2018

(86) PCT No.: PCT/EP2018/060615
§ 371 (c)(1),
(2) Date: Nov. 1, 2019

(87) PCT Pub. No.: WO2018/202513
PCT Pub. Date: Nov. 8, 2018

(65) Prior Publication Data
US 2021/0167681 A1   Jun. 3, 2021

(30) Foreign Application Priority Data

May 2, 2017  (DE) .................... 10 2017 207 301.2

(51) Int. Cl.
  *H02M 1/32*  (2007.01)
  *H02P 29/68*  (2016.01)
  *H02M 7/5387*  (2007.01)
(52) U.S. Cl.
  CPC ........... *H02M 1/32* (2013.01); *H02M 7/5387* (2013.01); *H02P 29/68* (2016.02); *H02M 1/327* (2021.05)

(58) Field of Classification Search
  CPC ................ H02M 1/32; H02M 7/5387; H02M 2001/327; H02P 29/98
  See application file for complete search history.

(56) References Cited

U.S. PATENT DOCUMENTS

2002/0131285 A1   9/2002  Kawakami
2015/0256105 A1*  9/2015  Kano .................. B60L 15/2009
                                                   307/10.1
(Continued)

FOREIGN PATENT DOCUMENTS

CN       103842604 A1    6/2014
DE       102007018829   11/2008
(Continued)

OTHER PUBLICATIONS

International Search Report for Application No. PCT/EP2018/060615 dated Aug. 1, 2018 (English Translation, 2 pages).

*Primary Examiner* — Rafael O De Leon Domenech
(74) *Attorney, Agent, or Firm* — Michael Best & Friedrich LLP

(57) ABSTRACT

The invention relates to the controlling of a multi-phase rectifier for adapting the temperature distribution in the rectifier. According to the invention, the phase currents in the individual phases are adjusted on the output-side of the rectifier with a different amplitude. Correspondingly, the respective half bridges in the rectifier are loaded to a differing degree. In this way, an uneven temperature distribution can be compensated in the rectifier. Alternatively, an uneven temperature distribution can also be adjusted in the rectifier in a targeted manner, in order to take further parameters into account.

8 Claims, 2 Drawing Sheets

(56) References Cited

U.S. PATENT DOCUMENTS

| | | | | |
|---|---|---|---|---|
| 2015/0340982 A1* | 11/2015 | Deflorio | ............... | H02M 7/42 |
| | | | | 318/139 |
| 2015/0357934 A1* | 12/2015 | Hirsch | ............... | H02P 29/68 |
| | | | | 318/400.02 |
| 2016/0111973 A1* | 4/2016 | Deflorio | ............... | H02P 21/22 |
| | | | | 318/400.02 |
| 2016/0373047 A1 | 12/2016 | Loken et al. | | |

FOREIGN PATENT DOCUMENTS

| | | |
|---|---|---|
| EP | 2916443 | 9/2015 |
| JP | 201517712 A | 1/2015 |
| WO | 2008128882 A1 | 10/2008 |

\* cited by examiner

METHOD FOR CONTROLLING A RECTIFIER, CONTROL DEVICE FOR A RECTIFIER AND RECTIFIER

BACKGROUND OF THE INVENTION

The present invention relates to a method for driving a rectifier, to a control device for a rectifier and to a rectifier. The present invention relates in particular to driving a rectifier in order to optimize a temperature distribution in the rectifier.

Document DE 10 2007 018 829 A1 discloses a method and a device for driving a circuit breaker unit. To protect the circuit breaker unit against thermal overloading, a temperature benchmark of the circuit breaker unit is raised, a temperature increase during an operating phase of the circuit breaker unit is determined on the basis of the temporal profile of the temperature benchmark, and the power loss of the circuit breaker unit is subsequently limited such that the temperature increase does not exceed a predefined limit value.

In electrical drive systems, an electrical machine is generally supplied with electrical energy from an upstream rectifier. Such rectifiers comprise a plurality of semiconductor switching elements by way of which an electric current and/or an electric voltage is able to be set for the connected electrical machine. In this case, the switching elements are driven for example by way of a pulse width modulation method. Conventional modulation methods are for example space vector modulation, sinusoidal modulation, flat-top or flat-bottom. In this case, all of the switching elements are generally driven uniformly during normal operation. During operation, it needs to be ensured in this case that predefined limit values for the loading of the switching elements, such as for example a maximum temperature or the like, are not exceeded.

SUMMARY OF THE INVENTION

The present invention discloses a method for driving a rectifier, a control device for a rectifier and a rectifier.

What is accordingly provided is:

A method for driving a multiphase rectifier. The method comprises a step of determining a temperature distribution in the rectifier. The method furthermore comprises a step of setting predetermined phase currents in the rectifier. The predetermined phase currents in the rectifier are in this case set depending on the determined temperature distribution in the rectifier. In this case, an individual phase current is set for each phase of the rectifier.

What is furthermore provided is:

A control device for a multiphase rectifier. The control device comprises an evaluation apparatus and a control apparatus. The evaluation apparatus is designed to determine a temperature distribution in the rectifier. The control device is designed to calculate predetermined phase currents for the rectifier depending on the determined temperature distribution in the rectifier. The control apparatus is furthermore designed to provide a control variable for setting the calculated phase currents at the rectifier. The control device is in particular designed to calculate an individual phase current for each phase of the rectifier. It is accordingly possible to provide a control variable at the rectifier that makes it possible to set a phase current individually for each phase at the rectifier.

What is furthermore provided is:

A rectifier having a plurality of half-bridges and a control device according to the invention. Each of the half-bridges of the rectifier comprises an upper switching element and a lower switching element. The half-bridges are in this case designed to output respectively predefined phase currents.

The present invention is based on the finding that respective limit values that must not be exceeded during operation exist for the components of a rectifier, in particular for the switching elements that are used therein. These limit values also comprise in particular a maximum operating temperature or a maximum permissible increase in the operating temperature. An absolute or relative increase in the operating temperature may for example be evaluated in this case. A temperature difference, for example a temperature difference between a component (for example a switching element) of the rectifier and an adjacent component, such as for example a cooling apparatus or a coolant, may also be evaluated as limit value, wherein the temperature difference should as far as possible not exceed a predefined limit value. If the maximum operating temperature or temperature difference is nevertheless exceeded, then there is the risk of the corresponding components being damaged or destroyed or at least premature aging occurring. If a temperature that lies in the region of the maximum operating temperature or even possibly exceeds this maximum operating temperature is reached at one of the switching elements of the rectifier, then the power of the rectifier generally has to be reduced in order to avoid destruction or premature aging. In this case, the structure of the rectifier and of the attached cooling system may possibly lead to very different heating in the individual switching elements. In order to protect the switching elements and the entire rectifier, the power of the rectifier in this case already has to be reduced if at least one of the switching elements reaches or possibly exceeds the predefined maximum operating temperature.

One idea of the present invention is therefore to take this finding into account and to provide driving for a rectifier in which a temperature development in the individual components, in particular the switching elements of the rectifier, is able to be equalized. A nonuniform temperature distribution of the switching elements in the rectifier is thereby able to be counteracted. By way of example, by driving the individual switching elements in a suitable manner, it is possible to counteract a local temperature increase at one or more switching elements. The rectifier is thereby able to be operated at maximum power over a very wide range. Premature aging of one or more switching elements is furthermore also able to be taken into account in that a possibly more greatly loaded or already prematurely aged switching element is operated in a more sparing mode of operation, for example at a lower operating temperature.

According to one embodiment of the method for driving the rectifier, setting the predetermined phase currents in the rectifier comprises overlaying a fundamental frequency of the phase currents with at least one further harmonic. Particularly simple and efficient adjustment of the individual phase currents is thereby able to be achieved. Depending on the phase position of the harmonics, the amplitudes of individual phase currents are in particular able to be increased or reduced very easily with respect to the other phase currents.

According to one embodiment, the at least one further harmonic of the phase current comprises at least the second harmonic of the fundamental frequency. The at least one further harmonic may furthermore also for example comprise the sixth harmonic of the fundamental frequency of the phase current in a d-q system. Said harmonics relate in particular to the harmonics in a coordinate system fixed with respect to the rotor, the d-q system. In the case of control fixed with respect to the stator, the same harmonics or possibly also harmonics different therefrom may possibly be overlaid. Very good formation of the phase currents is thereby able to be achieved. In a system fixed with respect to the stator (u-v-w system), the harmonics shift to the corresponding sidebands in accordance with the Park transformation.

According to one embodiment, setting predetermined phase currents in the rectifier comprises adjusting the phase currents with a predetermined time constant. Adjusting the phase currents with a predetermined time constant avoids an abrupt change in the phase currents. The phase currents are thus varied gradually. As a result, an external user does not perceive any abrupt change that could possibly irritate the user.

According to one embodiment, setting the predetermined phase currents in the rectifier comprises overlaying the phase currents with a predefined offset. It is thereby possible for example to load the upper switching elements or the lower switching elements in the half-bridges of the rectifier to different extents and thus possibly to counteract different degrees of heating of the upper switching elements and of the lower switching elements.

According to one embodiment of the control device for the rectifier, the evaluation apparatus is designed to determine the temperature distribution in the rectifier depending on at least one temperature value recorded by way of sensors. For this purpose, the control device of the rectifier may comprise one or more temperature sensors that record a temperature in the rectifier and provide a corresponding sensor value.

According to one embodiment, the evaluation apparatus is designed to determine the temperature distribution in the rectifier on the basis of a computational model. This computational model may be based for example on the current calculated current values, or current values recorded by way of sensors, in the phase connections of the rectifier. The computational model may furthermore also take into account one or more temperatures recorded by way of sensors and determine a temperature distribution in the rectifier therefrom. The computational model may furthermore also jointly take into account any other further parameters, such as for example a cooling power of the rectifier or the like.

The above configurations and developments may be combined as desired with one another where expedient. Further configurations, developments and implementations of the invention also comprise combinations that are not explicitly cited of features of the invention that are described above or below with reference to the exemplary embodiments. A person skilled in the art will in this case in particular also add individual aspects to the respective basic forms of the invention as improvements and additions.

BRIEF DESCRIPTION OF THE DRAWINGS

The present invention is explained in more detail below with reference to the exemplary embodiments specified in the schematic figures of the drawings. In the figures.

DETAILED DESCRIPTION

Figure 1:
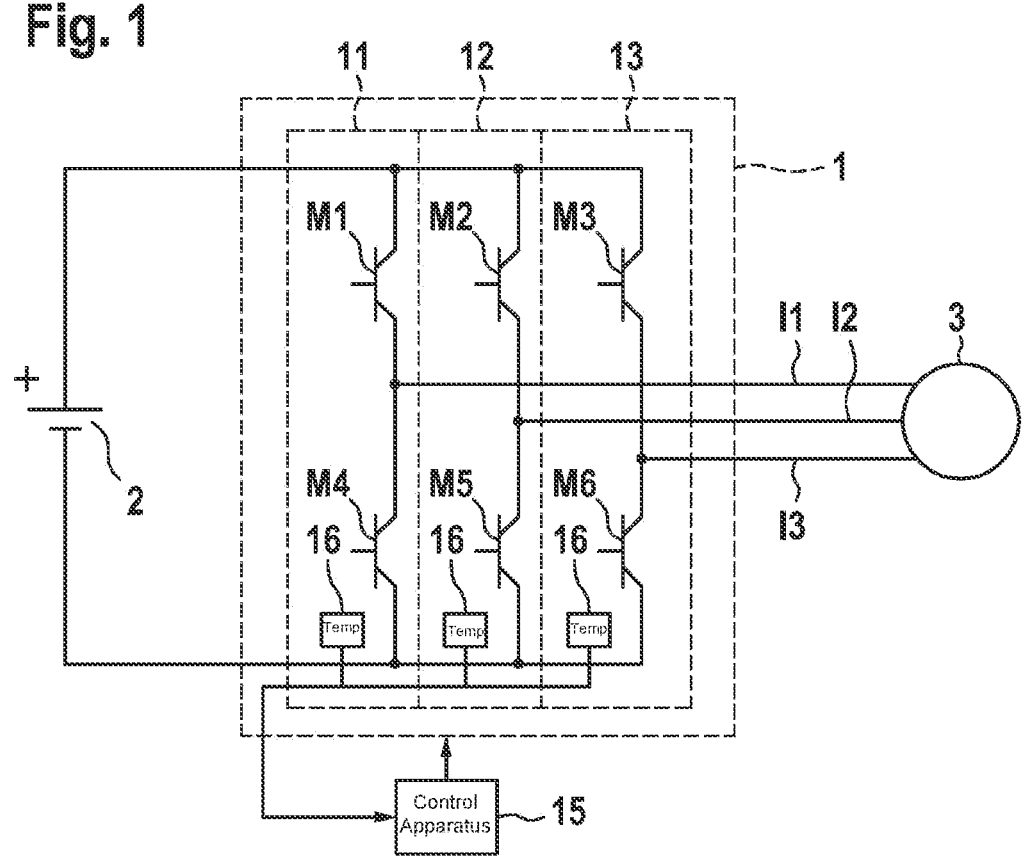
FIG. 1 shows a schematic illustration of an electrical drive system having a rectifier according to one embodiment.

FIG. 1 shows a schematic illustration of an electrical drive system having a rectifier 1 according to one embodiment. The rectifier 1 is supplied at input by an electrical energy source 2. By way of example, this electrical energy source 2 may be a battery, in particular for example the traction battery of an electric or hybrid vehicle. The rectifier 1 is electrically coupled at output to an electrical machine 3. The rectifier 1 generates a multiphase AC voltage from the voltage provided at input, here for example a DC voltage, and provides this AC voltage at output to the electrical machine 3. The electrical machine 3 is driven by way of a three-phase AC voltage in the exemplary embodiment illustrated here and the further description. The present invention is not however restricted to a three-phase AC voltage. The rectifier 1 may furthermore also provide any other multiphase AC voltage, in particular an AC voltage having more than three phases, in order to drive the electrical machine 3.

The rectifier 1 in this example comprises three half-bridges 11, 12, 13 each having an upper switching element M1 to M3 and each having a lower switching element M4 to M6. The switching elements M1 to M6 of the rectifier 1 are in this case driven by a control apparatus 15 by way of suitable control signals in order to generate the required multiphase output voltage from an input voltage. For this purpose, the individual switching elements M1 to M6 of the half-bridges 11, 12, 13 may be driven for example by the control apparatus 15 by way of pulse width-modulated signals. In a conventional mode of operation, the individual switching elements M1 to M6 of the half-bridges 11, 12, 13 are in this case generally driven uniformly, such that a three-phase AC voltage is provided at output, wherein the amplitudes in all of the phases, and therefore also the resultant phase currents I1 to I3, are of the same magnitude.

The individual components, in particular the switching elements M1 to M6, will heat up during operation of the rectifier 1. In order to dissipate the heat arising in this case, the rectifier 1 may for example dissipate the thermal energy from the switching elements M1 to M6 via a cooling device (not illustrated here). For this purpose, air or a liquid coolant may be used for example as coolant. As the coolant flows past the individual switching elements M1 to M6, the coolant heats up. If the coolant initially flows for example past the switching elements M1 and M4 of the first half-bridge 11 and then past the switching elements M2 and M5 of the second half-bridge and finally past the switching elements M3 and M6 of the third half-bridge, then this may lead to a situation whereby the switching elements M1 and M4 of the first half-bridge 11 are cooled to a greater extent than the other switching elements M2, M3, M5 and M6. This may lead to a situation whereby the switching elements that are cooled to a lesser extent, in particular the switching elements M3 and M6 of the third half-bridge 13, heat up to a greater extent.

Figure 2:
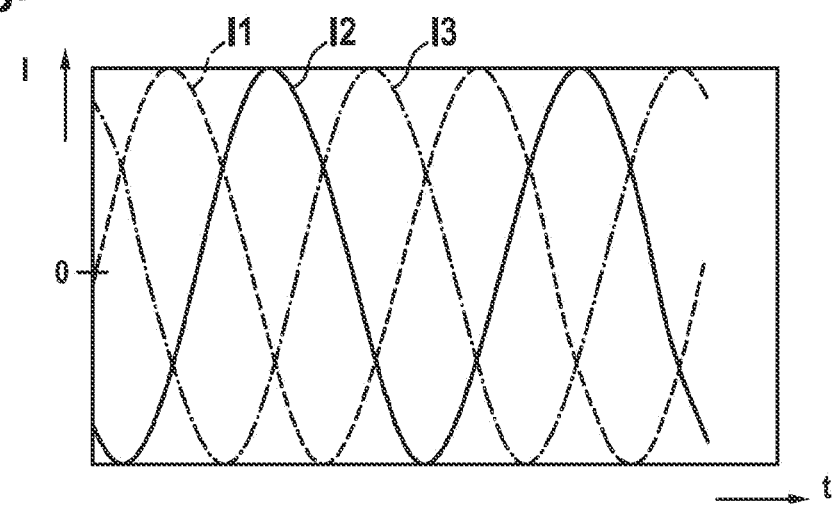
FIG. 2 shows a schematic illustration of the phase currents of a three-phase rectifier with phase currents of the same amplitude.

FIG. 2 shows a schematic illustration of a graph of current against time of the phase currents I1, I2, I3 in the phases between the rectifier 1 and the electrical machine 3 with uniform driving of the three half-bridges 11, 12 and 13. As is able to be seen here, all three of the phase currents I1, I2 and I3 have an equal amplitude. In the case of a transformation into a d-q system, this corresponds to a constant current Iq and Id.

If it is established during operation of the rectifier 1 that for example the switching elements of one half-bridge 11, 12 or 13 are heating up to a greater extent than the other switching elements and in this case in particular the temperature of these switching elements is possibly approaching a maximum permissible operating temperature, then the driving of the switching elements M1 to M6 in the half-bridges 11, 12, 13 may thereupon be adjusted in order to counteract this unequal temperature distribution. By way of example, an electric current that is provided by the half-bridge having the highest temperature may for this purpose be lowered in comparison with the phase currents of the other half-bridges. An electric current in a half-bridge 11, 12, 13 that has the lowest temperature may for example accordingly be increased in comparison with the other half-bridges. Unequal, asymmetric phase currents I1 to I3 are thus set in the phases between the rectifier 1 and the electrical machine 3. The effective value of the phase current at the electrical fundamental frequency matching the mechanical rotational frequency is in this case decisive for the average torque of the electrical machine 3.

The temperature distribution in the rectifier 1 that underlies the setting of an unequal current distribution in the phase currents I1 to I3 output by the rectifier 1 may in this case be determined for example by way of one or more temperature sensors 16. By way of example, a corresponding temperature sensor 16 may be provided at each of the switching elements M1 to M6. As an alternative, it is also possible to provide a temperature sensor 16 on just each half-bridge 11, 12, 13 or possibly also to provide just a single temperature sensor 16 for the entire rectifier 1.

The detailed temperature distribution in the rectifier 1 may also be determined, in addition to the temperature recorded by way of sensors using the temperature sensor 16, additionally or possibly completely by way of a computational model. For this purpose, this computational model may for example take into account theoretically calculated values, or values recorded by way of measurement, of electric currents, for example the phase currents I1 to I3 between the rectifier 1 and the electrical machine 3. Further parameters, such as for example a currently set cooling power of a cooling system coupled to the rectifier 1, a coolant temperature or further parameters, may also furthermore be taken into account.

Suitable values for the phase currents I1, I2 and I3 may then be calculated on the basis of the measured or calculated temperature distribution in the rectifier 1. In this case, values that lead to a temperature distribution in the rectifier 1 that is as uniform as possible may in particular be calculated for the phase currents I1, I2 and I3. Targets for the phase currents I1, I2 and I3 may possibly also be calculated, these loading one or more of the switching elements M1 to M6 to a lesser extent than other switching elements M1 to M6 in order thus to spare these switching elements M1 to M6. Calculated aging, or aging recorded by way of measurement, of individual switching elements M1 to M6 may in particular in this case possibly be taken into account.

Figure 3:
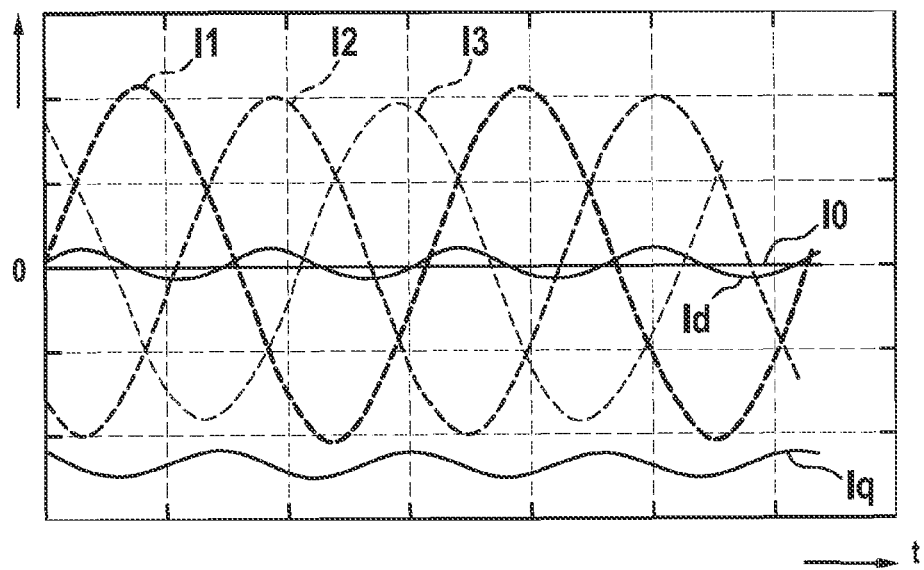
FIG. 3 shows a schematic illustration of unequal phase currents, as result using a method for driving the rectifier in one embodiment.

FIG. 3 shows a schematic illustration of a graph of current against time with an unequal distribution of the phase currents I1 to I3, underlying driving according to one embodiment. As is able to be seen in this case, the phase current I3 is lowered with respect to the other phase currents I1 and I2, whereas the phase current I1 is increased with respect to the other two phase currents I2 and I3. The switching elements M3 and M6 for the third phase current I3 are thereby able to be loaded to a lesser extent. A further temperature increase in the third half-bridge 13 is thereby in particular possibly able to be prevented or at least minimized. In a corresponding d-q system, the constant currents of the d-component and of the q-component are overlaid with a current of the second harmonic and a suitable phase shift. Such overlaying of the fundamental frequency of the phase currents in a d-q system with the second harmonic in order to adjust the phase currents I1 to I3 essentially brings about a ripple in the torque, in this case resulting in no or only very low effects on the average torque of the electrical machine 3. The ripple that occurs may possibly be minimized by modulating further harmonics, for example the sixth harmonic in the d-q system. Said harmonics in this case relate to the harmonics in the case of control in a d-q system. In a u-v-w system, the harmonics shift to the corresponding sidebands in accordance with the Park transformation. By way of example, overlaying the second harmonic in the d-q system corresponds to overlaying the third harmonic in the u-v-w system. In the same way, overlaying the sixth harmonic in the d-q system corresponds for example to overlaying the seventh harmonic in the u-v-w system.

Setting the phase currents I1 to I3 in an asymmetric manner leads, as described above, to a ripple in the torque, and thus possibly to corresponding noise development. This noise development may possibly be perceived by a user and lead to irritation under some circumstances. To minimize this irritation, amplitudes of the phase currents I1 to I3 may be varied in a non-abrupt manner. Rather, the individual adjustment of the individual phase currents I1 to I3 may be adjusted continuously, in particular with a predefined time constant, until reaching the desired end value. Only a gradual change in the noise development of the electrical machine will also thereby be noticeable. This gradual change in the noise development is perceived in a less drastic manner by a user and thus leads to less irritation.

Figure 4:
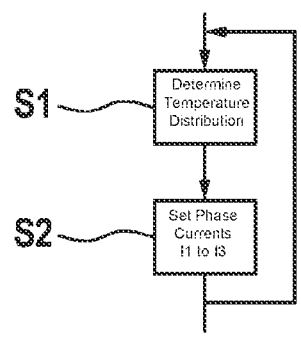
FIG. 4 shows a schematic illustration of a flowchart underlying a method for driving a multiphase rectifier according to one embodiment.

FIG. 4 shows a schematic illustration of a flowchart underlying a method for driving a multiphase rectifier 1 according to one embodiment. In step S1, a temperature distribution in the rectifier 1 is determined. The determination of this temperature distribution by way of sensor values and/or a computational model has already been described in detail above. In step S2, predetermined phase currents I1 to I3 are set in the rectifier 1 with the determined temperature distribution. In this case, an individual phase current I1 to I3 may be set for each phase of the rectifier 1. The phase currents I1 to I3 may be set for example by way of control in a d-q system. In this case, a fundamental frequency may in particular be overlaid with at least one further harmonic of the phase current. The harmonics to be overlaid may be for example the second harmonic in the d-q system. A sixth harmonic of the phase current may possibly also furthermore be overlaid. It is furthermore likewise possible to overlay further harmonics.

In order possibly to counteract a different temperature distribution in the upper switching elements M1 to M3 and the lower switching elements M4 to M6, an asymmetric setting of the phase currents with a predefined offset may also be set.

In summary, the present invention relates to driving a multiphase rectifier in order to adjust the temperature distribution in the rectifier. For this purpose, there is provision to set the phase currents in the individual phases on the output side of the rectifier with a different amplitude. The respective half-bridges in the rectifier are accordingly loaded to different extents. A nonuniform temperature distribution in the rectifier is thereby able to be compensated. As an alternative, a nonuniform temperature distribution may also be intentionally set in the rectifier in order to take into account further boundary conditions.

The invention claimed is:

1. A method for driving a multiphase rectifier (1) including a plurality of half-bridges (11, 12, 13) having an upper switching element (M1 ... M3) and a lower switching element (M4 ... M6), wherein each half-bridge (11, 12, 13) is configured to output a predefined phase current (I1 ... I3), the method comprising:
   determining (S1) a temperature distribution in the rectifier (1); and
   setting (S2) predetermined phase currents (I1 ... I3) in the rectifier (1) depending on the determined temperature distribution in the rectifier (1),
   wherein an individual phase current (I1 ... I3) is set for each phase of the rectifier (1) to counteract a local temperature increase at one or more of the switching elements (M1 ... M6)),
   wherein the amplitudes of the individual phase currents (I1 ... I3) are increased or decreased compared to the other phase currents.

2. The method as claimed in claim 1, wherein setting predetermined phase currents (I1 ... I3) in the rectifier (1) includes adjusting the phase currents (I1 ... I3) with a predetermined time constant.

3. The method as claimed in claim 1, wherein setting (S2) predetermined phase currents (I1 ... I3) in the rectifier (1) includes overlaying the phase currents (I1 ... I3) with a predefined offset.

4. A method for driving a multiphase rectifier (1), the method comprising:
   determining (S1) a temperature distribution in the rectifier (1);
   setting (S2) predetermined phase currents (I1 ... I3) in the rectifier (1) depending on the determined temperature distribution in the rectifier (1),
   wherein an individual phase current (I1 ... I3) is set for each phase of the rectifier (1),
   wherein the setting (S2) of predetermined phase currents (I1 ... I3) in the rectifier (1) includes overlaying a fundamental frequency with at least one further harmonic of a predetermined phase current (I1 ... I3),
   wherein the at least one further harmonic includes at least the second harmonic of the fundamental frequency of the phase current (I1 ... I3) in a d-q system.

5. The method as claimed in claim 4, wherein the further harmonic furthermore comprises at least the sixth harmonic of the fundamental frequency of the phase current (I1 ... I3) in a d-q system.

6. A controller for a multiphase rectifier (1) including a plurality of half-bridges (11, 12, 13) having an upper switching element (M1 ... M3) and a lower switching element (M4 ... M6), wherein each half-bridge (11, 12, 13) is configured to output a predefined phase current (I1 ... I3), the controller comprising:
   an evaluation apparatus that is configured to determine a temperature distribution in the rectifier (1);
   the controller is configured to calculate predetermined phase currents (I1 ... I3) for the rectifier (1) depending on the determined temperature distribution in the rectifier (1) and to provide a control variable for setting the calculated phase currents for the rectifier (1), wherein the controller is configured to calculate an individual phase current for each phase of the rectifier (1) to counteract a local temperature increase at one or more of the switching elements (M1 ... M6),
   wherein the amplitudes of individual phase currents are increased or decreased compared to the other phase currents.

7. The controller as claimed in claim 6, wherein the evaluation apparatus is configured to determine the temperature distribution in the rectifier (1) depending on temperature values recorded by way of temperature sensors (16).

8. The controller as claimed in claim 6, wherein the evaluation apparatus is configured to determine the temperature distribution in the rectifier (1) by way of a computational model.

* * * * *